US012735015B2

(12) United States Patent
Klostermann et al.

(10) Patent No.: US 12,735,015 B2
(45) Date of Patent: Sep. 15, 2026

(54) ELECTROPNEUMATIC VALVE ASSEMBLY WITH SELF-LOCKING SAFETY VALVE

(71) Applicant: ZF CV Systems Global GmbH, Bern (CH)

(72) Inventors: Thilo Klostermann, Barsinghausen (DE); Robert Otremba, Ronnenberg (DE); Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 289 days.

(21) Appl. No.: 18/537,440

(22) Filed: Dec. 12, 2023

(65) Prior Publication Data

US 2024/0109524 A1 Apr. 4, 2024

Related U.S. Application Data

(63) Continuation of application No. PCT/EP2022/068603, filed on Jul. 5, 2022.

(30) Foreign Application Priority Data

Jul. 5, 2021 (DE) ..................... 10 2021 117 210.1

(51) Int. Cl.
*B60T 13/68* (2006.01)
*B60T 8/36* (2006.01)
(Continued)

(52) U.S. Cl.
CPC .......... *B60T 13/683* (2013.01); *B60T 8/3605* (2013.01); *B60T 13/385* (2013.01); *B60T 17/083* (2013.01)

(58) Field of Classification Search
CPC ........ B60T 13/04; B60T 13/26; B60T 13/261; B60T 13/268; B60T 13/38; B60T 13/385;
(Continued)

(56) References Cited

U.S. PATENT DOCUMENTS 8,926,026 B2 * 1/2015 Vuckovic .............. B60T 13/385 303/3
11,584,345 B2 * 2/2023 Brütt ..................... B60T 8/1708
(Continued)

FOREIGN PATENT DOCUMENTS

CN 101970270 A * 2/2011 ............ B60T 13/683
CN 107735295 A * 2/2018 ............ B60T 13/683
(Continued)

OTHER PUBLICATIONS

International Search Report of the European Patent Office dated Oct. 14, 2022 for international application PCT/EP2022/068603.
(Continued)

*Primary Examiner* — Devon C Kramer
(74) *Attorney, Agent, or Firm* — Walter Ottesen, P.A.

(57) ABSTRACT

An electropneumatic valve assembly is for activating a parking brake function of an electropneumatic brake system. The valve assembly has a pilot control unit and a main valve unit configured to actuate a parking brake pressure at least at one spring-accumulator connection. The valve assembly has a service brake connection for receiving a service brake pressure and a safety valve. The safety valve, by receiving a safety control pressure, is switchable from a venting position, in which the safety valve connects the pilot control unit to a vent, to a supply position, in which the safety valve supplies the pilot control valve with reservoir pressure, the safety valve remaining in the supply position or switching to the venting position as a function of an actuated pressure. The service brake connection is connected to the safety valve control connection.

19 Claims, 7 Drawing Sheets

(51) Int. Cl.
*B60T 13/38* (2006.01)
*B60T 17/08* (2006.01)

(58) Field of Classification Search
CPC .... B60T 13/683; B60T 13/662; B60T 8/3605; B60T 17/083
See application file for complete search history.

(56) References Cited

U.S. PATENT DOCUMENTS

| | | | | |
|---|---|---|---|---|
| 2015/0239441 | A1* | 8/2015 | Klostermann | B60T 11/108 303/7 |
| 2019/0308599 | A1* | 10/2019 | Schmidt | B60T 15/027 |
| 2019/0337503 | A1* | 11/2019 | Otremba | B60T 13/662 |
| 2020/0207319 | A1 | 7/2020 | Van Thiel | |
| 2021/0162974 | A1 | 6/2021 | Van Thiel | |
| 2022/0144235 | A1* | 5/2022 | Van Thiel | B60T 15/027 |
| 2022/0194340 | A1 | 6/2022 | Schuppert et al. | |
| 2022/0227342 | A1 | 7/2022 | Klostermann et al. | |
| 2023/0256947 | A1* | 8/2023 | van Thiel | B60T 8/94 303/14 |

FOREIGN PATENT DOCUMENTS

| | | | | | |
|---|---|---|---|---|---|
| CN | 112368195 | A | | 2/2021 | |
| CN | 114728645 | A | * | 7/2022 | B60T 13/385 |
| DE | 102012000435 | A1 | * | 7/2013 | B60T 7/042 |
| DE | 10 2017 007 781 | A1 | | 2/2019 | |
| DE | 10 2019 125 747 | A1 | | 3/2021 | |
| DE | 10 2019 130 762 | A1 | | 5/2021 | |
| DE | 102020132875 | A1 | * | 6/2022 | B60T 13/261 |
| EP | 1785325 | A1 | * | 5/2007 | B60T 13/683 |
| EP | 3112230 | A1 | * | 1/2017 | B60T 13/22 |
| KR | 20190020742 | A | * | 3/2019 | B60T 15/041 |
| WO | WO-2007065498 | A1 | * | 6/2007 | B60T 13/683 |
| WO | 2008/116598 | A2 | | 10/2008 | |
| WO | 2009/046779 | A1 | | 4/2009 | |
| WO | WO-2018172333 | A1 | * | 9/2018 | B60T 13/263 |
| WO | WO-2018172340 | A1 | * | 9/2018 | B60T 8/1708 |
| WO | WO-2019068393 | A1 | * | 4/2019 | B60T 13/683 |
| WO | WO-2020015975 | A1 | * | 1/2020 | B60T 17/221 |
| WO | WO-2020025225 | A1 | * | 2/2020 | B60T 13/263 |
| WO | WO-2021094116 | A1 | * | 5/2021 | B60T 13/683 |
| WO | WO-2021104939 | A1 | * | 6/2021 | B60T 8/94 |
| WO | WO-2023001472 | A1 | * | 1/2023 | B60T 17/22 |

OTHER PUBLICATIONS

English translation and Office action of the Chinese Patent Office dated Mar. 31, 2026 in corresponding Chinese patent application 202280044606.8.

English translation and Written Opinion of the International Searching Authority dated Oct. 14, 2022 for international application PCT/EP2022/068603.

* cited by examiner

ELECTROPNEUMATIC VALVE ASSEMBLY WITH SELF-LOCKING SAFETY VALVE

CROSS-REFERENCE TO RELATED APPLICATIONS

This application is a continuation application of international patent application PCT/EP2022/068603, filed Jul. 5, 2022, designating the United States and claiming priority from German application 10 2021 117 210.1, filed Jul. 5, 2021, and the entire content of both applications is incorporated herein by reference.

TECHNICAL FIELD

The disclosure relates to an electrical pneumatic valve assembly for activating a parking brake function of an electropneumatic brake system of a commercial vehicle, having a pilot control unit which actuates a pilot control pressure as a function of an electronic parking brake signal; and a main valve unit which is adapted to receive the pilot control pressure and to actuate a parking brake pressure at least at one spring-accumulator connection. The disclosure furthermore relates to an electropneumatic brake system, to a method for controlling a parking brake function of a vehicle, and to a vehicle.

BACKGROUND

Electropneumatic valve assemblies for activating a parking brake function are used both in Europe and in the United States. A parking brake function of an electropneumatic brake system typically utilizes so-called spring-accumulator brake cylinders which close by virtue of a spring force and are open in the aerated state. These spring-accumulator brake cylinders should thus be aerated and thus released when in motion, while they should be vented and thus clamp in the parked state of the vehicle.

The spring-accumulator brake cylinders can be combined with service brake cylinders so that the spring-accumulator brakes and service brakes act on the same brake pistons. Mechanical overloading of the brake pistons as a result of addition of the brake forces of the service brake and the spring-accumulator brake can be avoided by suitable constructive measures. If the service brakes are to be activated in the case of clamped parking brakes, the spring-accumulator brake cylinders are simultaneously aerated in order to avoid an addition of the brake forces. This functionality is often referred to as anti-compound function.

Owing to statutory requirements, it must be guaranteed that electropneumatic parking brakes remain in the momentary switched position in the case of a defect. In the United States, automatic and permanent activation of the parking brake is additionally required when a reservoir pressure of the parking brake undershoots a defined critical value. In order for this functionality to be implemented, so-called push-pull valves are used in the driver's cab in pneumatic systems, by way of which the driver can manually effect the aerating or venting of the spring-accumulator brake cylinders. When the push-pull valve is depressed, a pneumatic connection is established, such that the spring-accumulator brake cylinders of the tractor unit are aerated and thus released. In contrast, if the driver pulls the push-pull valve out, the spring-accumulator brake cylinders are vented and clamp. Furthermore, the push-pull valves are adapted to automatically jump out if the reservoir pressure undershoots the critical value.

Since the drivers of corresponding vehicles are used to this functionality, a corresponding behavior should also be implemented for electropneumatically implemented parking brake functions. Furthermore, the complexity in terms of the pneumatic piping of valves which implement the parking brake function, and for the driver's cab, are relatively high in comparison to the spring-accumulator brake cylinders which are usually provided on the rear axle. There is therefore a requirement for this to be simplified. There is furthermore the requirement for improving the reliability of the parking brake function. It is furthermore desirable that the parking brake can also be pneumatically released in the event of an electrical fault.

In a first aspect of the disclosure, an object of the disclosure is achieved via an electropneumatic valve assembly having a service brake connection for receiving a service brake pressure and a pneumatically switchable self-holding safety valve which is disposed upstream of the pilot control unit, and a safety valve control connection for receiving a safety control pressure, and a safety valve holding circuit for receiving a pressure actuated by the safety valve, or a pressure derived therefrom. By receiving the safety control pressure, the safety valve is switchable from a venting position, in which the safety valve connects the pilot control unit to a vent, to a supply position, in which the safety valve supplies the pilot control unit with reservoir pressure, wherein the safety valve remains in the supply position or switches to the venting position as a function of the actuated pressure received at the safety valve holding circuit. The service brake connection is fluidically connected directly or indirectly to the safety valve control connection.

The switching of the safety valve from the venting position to the supply position takes place by receiving the safety control pressure at the safety valve control connection. The safety valve remains in this supply position as a function of the pressure which is actuated at the safety valve and thus is also applied to the safety valve holding connection. It can be achieved in this way that the pilot control unit is supplied with reservoir pressure only when the safety valve is in the supply position. The safety valve holds itself in the supply position when the pressure actuated by the safety valve meets requirements which will be defined at a later stage. A self-acting safety function is integrated in the electropneumatic valve assembly as a result of the safety valve, and the self-acting safety function does not have to be guaranteed by an external valve, which is complex to connect in terms of piping.

According to the disclosure, the switched position of the magnet valve is not only rendered as a function of the switched position set by way of the safety valve control connection, but also of the pressure which is actuated at the safety valve. A further level of reliability is provided as a result. This may take place pneumatically, mechanically or in some other way. This can preferably take place independently of any electrical energizing.

The indirect or direct connection between the safety valve control connection and the service brake connection allows the safety valve to be switchable by providing a service brake pressure. According to the disclosure, the safety valve can also be moved to the supply position even when there is an electrical fault in the electropneumatic valve assembly, thus permitting, for example, the parking brake to be released in order to recover the vehicle. A direct connection is present between the safety control connection and the service brake connection when the safety control connection and the service brake connection are connected to one another without any further functional elements. For example, the connections can be connected to one another by a direct line or pipe. A direct connection may also be present when manifolds are disposed between the two elements. An indirect connection between the safety control connection and the service brake connection is present when further functional elements, for example valves, are disposed between the safety control connection and the service brake connection. It is to be understood that an indirect connection also permits the service brake pressure to be provided directly at the safety valve control connection and (at least under certain operating conditions) without any substantial variation (with the exception of customary line losses).

In a first embodiment, the service brake connection is connectable to a front axle brake circuit and/or a rear axle brake circuit, wherein the service brake pressure is a front axle brake pressure and/or a rear axle brake pressure of the commercial vehicle. The front axle brake pressure and/or the rear axle brake pressure can be provided as a result of the direct or indirect fluidic connection between the safety valve control connection and the service brake connection. It can also be provided that a pressure derived from the front axle brake pressure and/or the rear axle brake pressure at the safety valve control connection is provided at the safety valve control connection. This enables the utilization of a front and/or rear axle brake pressure, which is already available in a brake system, in order for the safety valve to be switched, as a result of which the valve assembly can be configured in a compact and cost-effective manner. Furthermore, components and lines can be saved in a brake system which has a valve assembly according to the disclosure.

The service brake connection can preferably be a release control connection, wherein the service brake pressure is a release control pressure. The release control pressure can preferably be provided at the release control connection, the release control pressure preferably serving to aerate the spring-accumulator brake cylinders of a vehicle, or to enable a corresponding parking brake pressure to be provided at a spring-accumulator connection of the electropneumatic valve assembly (anti-compound function). In this embodiment, the service brake pressure of the electropneumatic valve assembly fulfils a dual function. In this way, the service brake pressure configured as release control pressure serves to switch the safety valve as required, and furthermore fulfils the anti-compound function described at the outset. In this way, the electropneumatic valve assembly can be configured in a particularly compact, simple and cost-effective manner.

The electropneumatic valve assembly preferably furthermore has a main control two-way valve which is configured to receive the pilot control pressure and the release control pressure and to provide the higher of the pilot control pressure and the release control pressure for the main valve unit, wherein the main valve unit actuates the parking brake pressure as a function of the release control pressure or of the pilot control pressure. The main control two-way valve either provides the pilot control pressure or the release control pressure at the main valve unit. The main valve unit is adapted to actuate the parking brake pressure at the spring-accumulator connection as a function of the respective received pressure (the pilot control pressure or the release control pressure). The main control two-way valve thus makes it possible for the pilot control pressure actuated by the pilot control unit as a function of the electronic parking brake signal to be overruled by the release control pressure provided at the release control connection, or vice versa. Dual braking of the vehicle by the simultaneous activation of the parking brake and the service brake can be prevented in this way.

In an alternative embodiment, the service brake connection is a redundancy connection, wherein the service brake pressure is a redundancy brake pressure or a pressure derived from the redundancy brake pressure. An advantageous dual utilization of the pressure provided at the service brake connection is also achieved in this embodiment. A pressure which is actuated for braking in the event of a redundancy is furthermore utilized for switching the safety switch valve. Like the aforementioned first alternative embodiment, this variant also permits a cost-effective and simple construction mode of the electropneumatic valve assembly and/or of a brake system. In one variant, the redundancy pressure is provided directly as service brake pressure at the safety valve control connection. Alternatively or additionally, however, it can also be provided that a pressure derived from the redundancy pressure is provided at the safety valve control connection. In order for the service brake pressure to be derived from the redundancy pressure, a secondary control unit can thus preferably be disposed between the redundancy connection and the safety valve control connection. The secondary control unit is particularly preferably a trailer control unit which is configured to actuate a trailer brake pressure. The electropneumatic valve assembly is then preferably configured to actuate the trailer brake pressure and to provide the latter at the trailer service brake connection. In this way, the electropneumatic valve assembly can preferably be a trailer control valve, or include a trailer control valve as a sub-function. The redundancy pressure in a brake system can preferably be provided by a brake value encoder, such as for example a foot brake module. In a brake system of a partially autonomous or autonomous vehicle, the service brake pressure can for example be provided largely autonomously based on electric signals from a central control unit, while a driver can provide a redundancy pressure by way of the foot brake module, in order for the vehicle to be braked in the event of a defect.

In an alternative embodiment, the service brake connection is a trailer service brake connection, wherein the service brake pressure is a trailer brake pressure. In this variant, the trailer brake pressure is provided at the electropneumatic valve assembly by an external unit which is not part of the electropneumatic valve assembly. For example, the external unit can be a conventional trailer control unit which is pneumatically connected to the electropneumatic valve assembly. The advantageous dual utilization, which has already been described with reference to the preceding alternative, results in this case too, wherein the trailer brake pressure is provided not by the electropneumatic valve assembly but by the external unit for the trailer and the electropneumatic valve assembly.

The electropneumatic valve assembly preferably furthermore has an electropneumatic safety switch unit which actuates a safety pilot control pressure as a function of an electronic safety switch signal. The safety switch unit can preferably be fluidically connected to the safety valve control connection so as to provide the safety pilot control pressure as safety control pressure at the safety valve control connection. The connection can be configured to be direct or indirect. For example, the safety switch unit can be connected directly to the safety valve control connection, wherein a manifold is disposed between the safety switch unit and the safety valve control connection, the manifold also connecting the service brake connection directly or indirectly to the safety valve control connection. When both the service brake connection and the safety switch unit are connected directly to the safety valve control connection, the safety control pressure is potentially an equalization pressure of the safety pilot control pressure and the service brake pressure which occurs when both the safety pilot control pressure and the service brake pressure are both effective. However, the safety switch unit can preferably also be connected indirectly to the safety valve control connection. The safety switch unit can preferably be an electrically switchable 3/2-way valve.

According to an embodiment, the electropneumatic valve assembly furthermore has a safety two-way valve which is configured to receive the safety pilot control pressure and the service brake pressure and to actuate the higher of the safety pilot control pressure and the service brake pressure as safety control pressure. When both a service brake pressure and a safety pilot control pressure are provided at the safety two-way valve, the higher of these two pressures forms the safety control pressure. The safety control pressure can then preferably be provided in two ways. On the one hand, the safety pilot control pressure can be provided as a function of safety switch signals by means of the electropneumatic safety switch unit and, on the other hand, the service brake pressure can serve as safety control pressure. The safety two-way valve prevents the safety valve control connection from being impinged multiple times, thus preventing mechanical overloading.

The safety switch unit can preferably be configured to receive a reservoir pressure, and in a first switched position configured to actuate the reservoir pressure as safety pilot control pressure. It is preferred for the safety switch unit to be fluidically connected to a reservoir connection. In this way, air can be supplied at a reservoir pressure at the safety switch unit by way of a reservoir connection.

In an embodiment, the safety switch unit in a second switched position connects the safety two-way valve to a vent. It can preferably also be provided that the safety switch unit in the second switched position connects the safety valve control connection to the vent when the safety switch unit is connected directly to the safety valve control connection. In a brake system, the reservoir pressure generally has the highest pressure level. In this case, reliable switching can be achieved by way of the safety switch unit. When the safety switch unit is switched to the first switched position by energizing (if safety switch signals are provided), the reservoir pressure is provided directly at the safety valve control connection or at the safety two-way valve, which in turn then provides the reservoir pressure as safety control pressure at the safety valve control connection. However, when the safety switch unit is in the second switched position, switching of the safety valve is prevented in the case of a direct connection, because the safety valve control connection is connected to the vent. In the case of an indirect connection by way of the safety two-way valve, switching of the safety valve is still possible, but only when the service brake pressure is provided. The safety switch unit can preferably be a monostable safety switch unit which is particularly preferably preloaded to the second switched position.

In an embodiment, the safety valve remains in the supply position when the actuated pressure applied to the safety valve holding circuit exceeds a first threshold value, and switches to the venting position if the actuated pressure applied to the safety valve holding circuit reaches or undershoots the first threshold value. The safety valve switches as a function of the actuated pressure. When the actuated pressure is above the first threshold value, the safety valve holds itself in the supply position by means of the pressure received at the safety valve holding circuit. By contrast, however, if the actuated pressure is below the first threshold value, the safety valve switches to the venting position. In this case, no reservoir pressure is provided at the pilot control unit, and the parking brake pressure may only still be actuated if the main valve unit receives a different pressure (for example the service brake pressure). It can preferably also be provided that the safety valve switches to the venting position if the actuated pressure applied to the safety valve holding circuit undershoots the first threshold value. The safety valve holding circuit can be a circuit which is external to the safety valve, or be configured internally on the safety holding valve. In this way, the safety valve can have for example an inner duct, which feeds back to a safety valve connection that is connected to the pilot control unit. However, the connection that is connected to the pilot control unit, of the safety valve may preferably also be connected to a safety valve holding connection by an external line.

The first threshold value can preferably be in a range from 150 kPa to 450 kPa, preferably from 170 kPa to 450 kPa, preferably 170 kPa to 420 kPa, preferably 180 kPa to 420 kPa, preferably 180 kPa to 400 kPa, preferably 200 kPa to 400 kPa, preferably 200 kPa to 380 kPa, preferably 200 kPa to 370 kPa, preferably 200 kPa to 350 kPa, preferably 200 kPa to 320 kPa, preferably 200 kPa to 300 kPa, preferably 210 kPa to 300 kPa, preferably 210 kPa to 280 kPa, preferably 220 kPa to 280 kPa, preferably 230 kPa to 280 kPa, particularly preferably 250 kPa to 315 kPa.

In an embodiment, the safety valve has a tension spring which preloads the safety valve to the venting position. In a non-pressurized state, the safety valve, driven by the tension spring, assumes the venting position. A restoring force provided by the tension spring has to be overcome in order for the safety valve to switch to the supply position. The restoring force of the tension spring particularly preferably determines the first threshold value.

The pilot control unit can preferably be a bistable pilot control unit. The bistable pilot control unit is stable in two switched states, that is, in the event of the electropneumatic valve assembly becoming non-energized, the bistable pilot control unit thus remains in that switched state to which it was switched prior to the non-energized state occurring. In this way, the pilot control unit maintains its switched state and, after re-energizing of the electropneumatic valve unit, a state prevails which can preferably be identical to a state which prevailed prior to the interruption of the power supply. Any unintentional engagement and/or release of the parking brake when the electropneumatic valve assembly is re-energized is prevented.

The bistable pilot control unit preferably has a bistable electromagnetic magnet valve having at least one first permanent magnet. The permanent magnet holds the bistable electromagnetic magnet valve in a latching position even in the non-energized state. The bistable electromagnetic magnet valve preferably furthermore has a first coil. An armature of the magnet valve, which preferably contains the permanent magnet, can be moved to the first latching position by energizing the first coil. The bistable electromagnetic magnet valve preferably furthermore has a second permanent magnet and/or a second coil, these particularly preferably being configured in a manner analogous to the first permanent magnet and to the first coil. In this way, the bistable electromagnetic magnet valve can preferably be magnetically latched in two latching positions. If there is then no other force acting on the armature, or the latter is able to be mechanically and/or magnetically latched in the positions, the respective switched position is stable because it can be maintained without further energizing.

In a second aspect, the disclosure achieves the object mentioned at the outset by an electropneumatic brake system, having an electropneumatic valve assembly according to the first aspect of the disclosure, and a service brake circuit having a brake module for providing the service brake pressure, wherein the brake module is fluidically connected to the service brake connection of the electropneumatic valve assembly. An electropneumatic brake system is controllable at least in part by means of electric signals. In this way, a braking function can be controlled for example during a completely or partially autonomous driving operation by brake signals which are provided by a central control unit. The brake module can preferably be an electropneumatic brake module, in particular an electropneumatic foot brake module, a manual brake module, in particular a conventional pneumatic foot brake module, or an electronic brake module which emits a service brake pressure as a function of a brake signal. The brake system can preferably also have a plurality of service brake circuits, wherein the brake module can also provide service brake pressures for different brake circuits. For example, a front axle brake circuit for braking wheels of a front axle of a vehicle can be actuated with a front axle service brake pressure by the brake module, while the brake module furthermore provides a rear axle service brake pressure for a rear axle brake circuit for braking wheels of a rear axle of the vehicle.

In a third aspect, the object mentioned at the outset is achieved by a method for controlling a parking brake function of a vehicle, in particular a commercial vehicle, having an electropneumatic brake system, in particular an electropneumatic brake system according to the second aspect of the disclosure, the method including the following steps: pneumatic switching of a safety valve to a supply position in which the safety valve, by providing a safety control pressure at a safety valve control connection, supplies a pilot control unit with reservoir pressure; receiving the reservoir pressure at the pilot control unit and actuating a pilot control pressure by the pilot control unit as a function of an electronic parking brake signal; providing a service brake pressure by a brake module of a service brake circuit; actuating a parking brake pressure at least at one spring-accumulator connection by a main valve unit as a function of the service brake pressure or of the pilot control pressure; wherein the safety control pressure is the service brake pressure or a reservoir pressure which is provided by electromagnetically opening a safety switch unit at the safety valve control connection. It can preferably by provided in the method that the safety valve has a safety valve holding circuit so that a pressure actuated by the safety valve is returned. The method preferably furthermore includes: connecting the pilot control unit to a vent if the returned actuated pressure undershoots a first threshold value.

In a fourth aspect, the disclosure achieves the object mentioned at the outset by a vehicle, in particular a commercial vehicle, having an electropneumatic brake system according to the second aspect of the disclosure.

It is to be understood that the electropneumatic brake system according to the second aspect of the disclosure, the method according to the third aspect of the disclosure, the vehicle according to the fourth aspect of the disclosure and the electropneumatic valve assembly according to the first aspect of the disclosure have identical and similar sub-aspects. In this respect, reference is made in full to the above description pertaining to the first aspect of the disclosure.

BRIEF DESCRIPTION OF DRAWINGS

The invention will now be described with reference to the drawings wherein.

DETAILED DESCRIPTION

Figure 1:
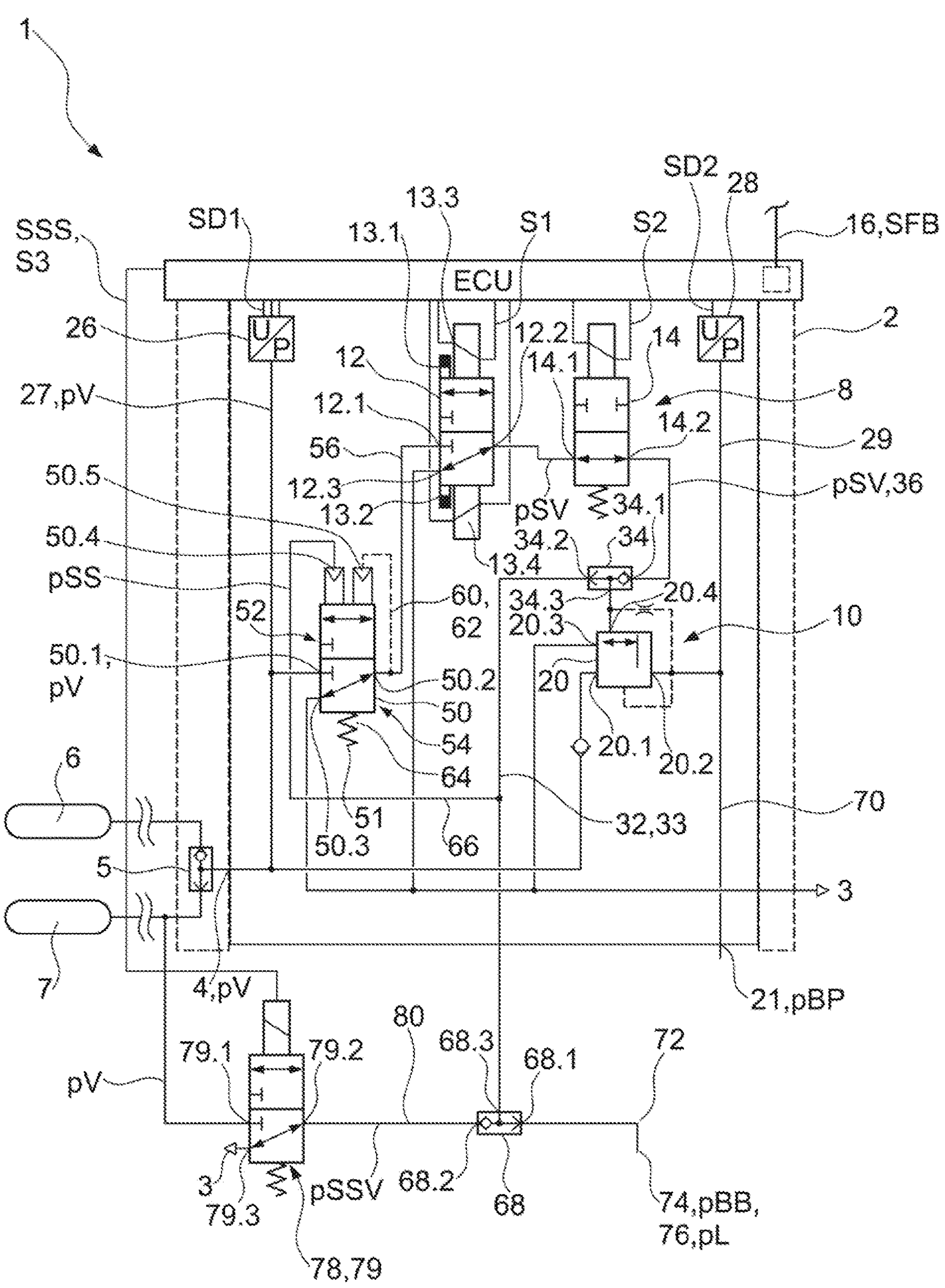
FIG. 1 shows a first embodiment of an electropneumatic valve assembly.
Figure 2:
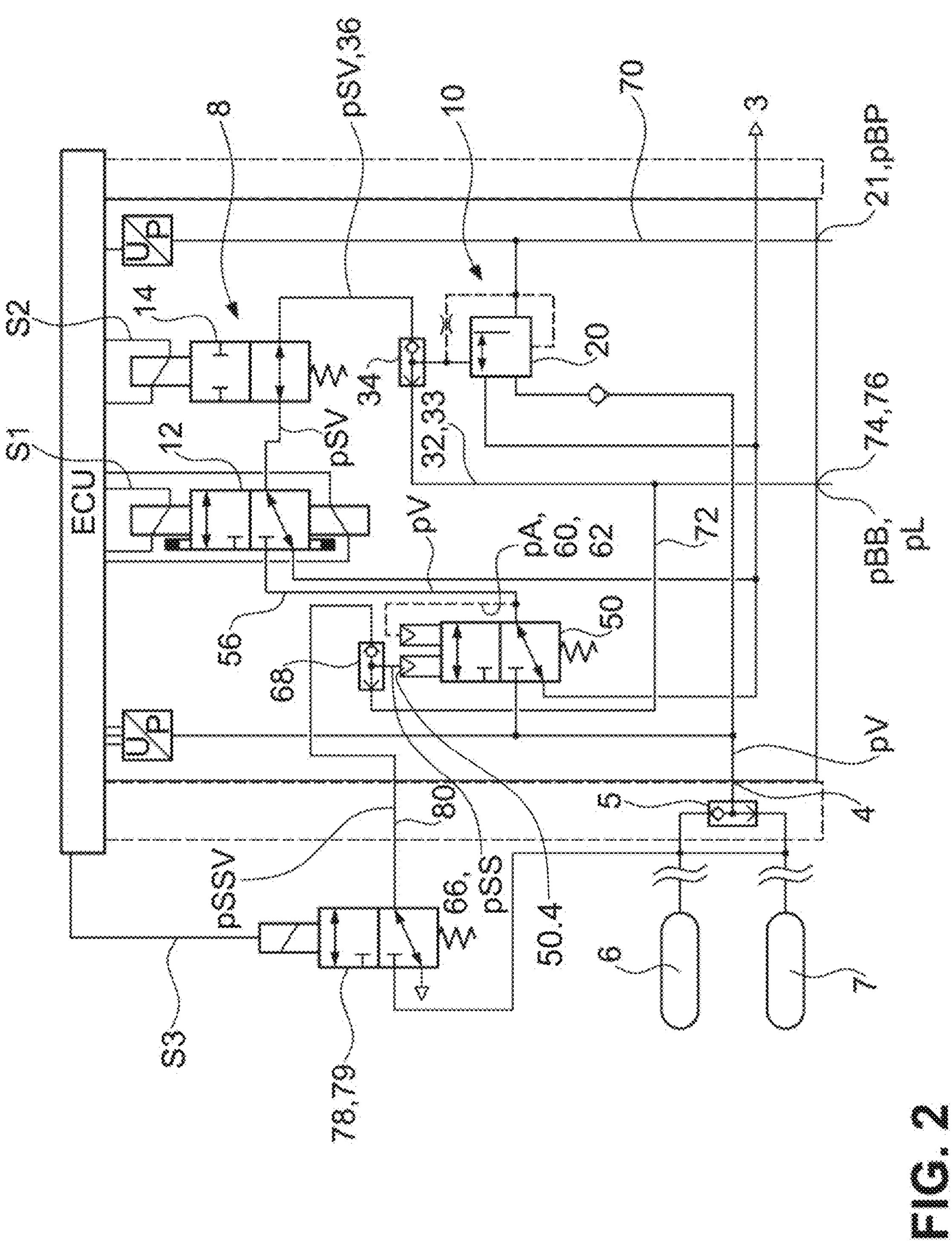
FIG. 2 shows a second embodiment of an electropneumatic valve assembly.
Figure 3:
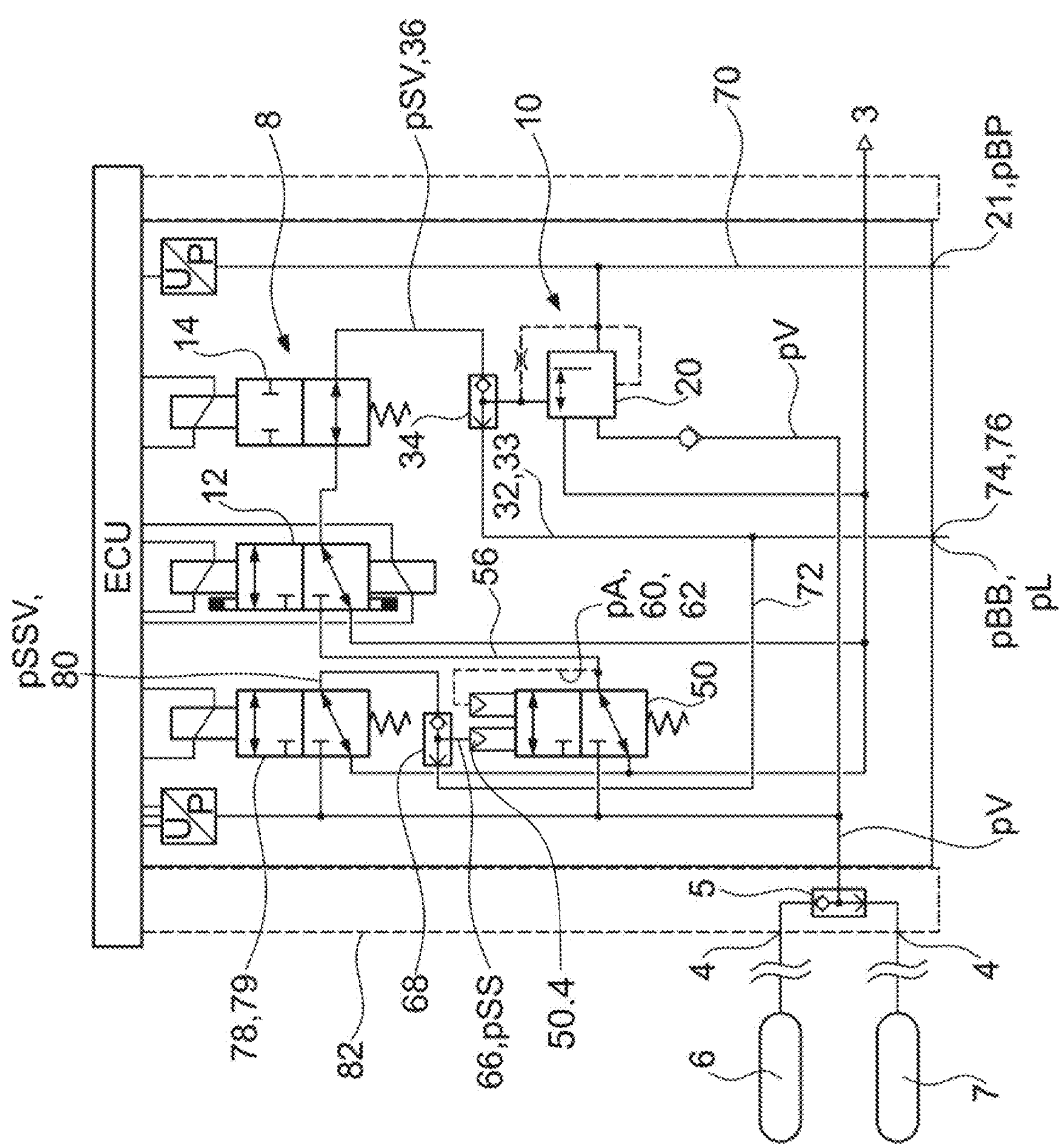
FIG. 3 shows a third embodiment of an electropneumatic valve assembly.

In the embodiments shown in FIGS. 1 to 6, an electropneumatic valve assembly 1 is configured as a parking brake module 2, although this is not mandatory, and the electropneumatic valve assembly 1 may in fact also be integrated with other units, and/or the individual valves described below may also be disposed separately and/or distributed in a brake system 202 (cf. FIG. 7).

The parking brake module 2 has a reservoir connection 4 to which are connected, by way of a reservoir two-way valve 5, a first compressed-air reservoir 6 and a second compressed-air reservoir 7 (FIG. 7), which provide in each case a reservoir pressure pV, so that the reservoir pressure pV is applied to the reservoir connection 4. It is not mandatory for two compressed-air supplies 6, 7 to be connected to the reservoir connection 4, rather it may suffice for only one compressed-air reservoir to be connected there, or for the reservoir connection 4 to be supplied by way of a further module.

The electropneumatic valve assembly 1 has a pilot control unit 8, which here is a bistable pilot control unit 8, and a main valve unit 10. The bistable pilot control unit 8 includes an electromagnetic magnet valve 12. The magnet valve 12 has a first magnet valve connection 12.1, a second magnet valve connection 12.2, and a third magnet valve connection 12.3. The first magnet valve connection 12.1 is connected to a safety valve 50 which has a supply position 52 and a venting position 54, shown in FIG. 1. In the embodiment shown, the safety valve 50 is preloaded to the venting position 54 by means of a tension spring 51. However, it may also be provided that the safety valve 50 is purely pneumatically activatable. For example, and preferably, the safety valve 50 could also be configured so as to be switchable between the venting position 54 and the supply position 52 by means of a dual-action pneumatic piston. The safety valve 50 has a first safety valve connection 50.1, a second safety valve connection 50.2, and a third safety valve connection 50.3. The first safety valve connection 50.1 is connected to the reservoir connection 4 and receives reservoir pressure pV. The first safety valve connection 50.1 and the second safety valve connection 50.2 are fluidically connected in the supply position 52, so that the reservoir pressure pV is actuated by way of the safety valve 50, and provided at the magnet valve 12 by way of a supply line 56, which connects the second safety valve connection 50.2 to the first magnet valve connection 12.1. In the venting position 54, the second safety valve connection 50.2, and, due to the direct connection also the first magnet valve connection 12.1, are connected to the third safety valve connection 50.3. The third safety valve connection 50.3 is connected to a vent 3, so that the first magnet valve connection 12.1 is vented by way of the safety valve 50 when the safety valve 50 is in the venting position 54. The switching of the safety valve 50 between the supply position 52 and the venting position 54 will be explained in more detail at a later stage.

The second magnet valve connection 12.2 is connected to the main valve unit 10, in the embodiments shown in FIGS. 1 to 5 indirectly by way of a holding valve 14. The third magnet valve connection 12.3 is connected to the vent 3. The magnet valve 12 has a first switched position, not shown in FIG. 1, in which the first magnet valve connection 12.1 is connected to the second magnet valve connection 12.2. In the second switched position, shown in FIG. 1, the third magnet valve connection 12.3 is connected to the second magnet valve connection 12.2. To this extent, the first switched position can also be referred to as aerating position, and the second switched position as venting position. In the aerating position, a pilot control pressure pSV is actuated by way of the magnet valve 12. The magnet valve 12 is switched as a function of a parking brake signal SFB which is received by the parking brake module 2 by way of a vehicle BUS 16, for example, or else can be provided directly at the magnet valve 12.

The magnet valve 12 has a first permanent magnet 13.1 and a second permanent magnet 13.2. Moreover, the magnet valve 12 in the embodiment shown also has a first coil 13.3 and a second coil 13.4. Either the first coil 13.3 or the second coil 13.4 is energized as a function of the parking brake signal SFB. If the first coil 13.3 is energized, an armature of the magnet valve 12 is attracted in a manner known in principle, and the magnet valve 12 is thus switched to the aerating position. The armature is then held in the aerating position by the first permanent magnet 13.1, the aerating position accordingly being a magnetic latching position. The first permanent magnet 13.1 and the first coil 13.3 are assigned to the aerating position. In contrast, however, if the second coil 13.4 is energized, the armature is pulled to the opposite latching position, and the magnet valve 12 is switched to the venting position. The armature is held in this latching position by the second permanent magnet 13.2. In principle however, just one coil 13.3, 13.4 could be provided, the polarity of which would then have to be reversed in order for the magnet valve 12 to be switched to the aerating position and venting position. It is also conceivable for just one permanent magnet 13.1, 13.2 to be provided, which is then preferably disposed on the armature of the magnet valve 12.

While not mandatory, the parking brake module 2 is equipped in the embodiments shown with a dedicated electronic control unit ECU and receives the parking brake signal SFB and consequently then actuates at least one first switch signal S1 at the magnet valve 12 in order to selectively switch the latter between the first and the second switched position. Should the parking brake module 2 not have a dedicated electronic control unit ECU, the first switch signal S1 can also be provided directly by an external control unit. The magnet valve 12 can in each case be switched to the first or second switched position by a pulse.

The pilot control pressure pSV, which is actuated by the magnet valve 12, is provided at the main valve unit 10 by way of the holding valve 14. The main valve unit 10 includes a relay valve 20 which has a relay valve reservoir connection 20.1, a relay valve working connection 20.2, a relay valve venting connection 20.3, and a relay valve control connection 20.4. The relay valve reservoir connection 20.1 is connected to the reservoir connection 4 and receives reservoir pressure pV. The relay valve working connection 20.2 is connected to a spring-accumulator connection 21 of the parking brake module 2, at which the main valve unit 10 actuates a parking brake pressure pBP. The relay valve venting connection 20.3 is connected to the vent 3, and the relay valve control connection 20.4 is connected to the pilot control unit 8 and receives the pilot control pressure pSV. One or a plurality of spring-accumulator brake cylinders 208*a*, 208*b* (cf. FIG. 7) can be connected to the spring-accumulator connection 21, which release when aerated and clamp by means of a spring force when vented.

In order for the spring-accumulator brake cylinders 208*a*, 208*b* to be released, the spring-accumulator connection 21 thus has to be aerated so that the parking brake pressure pBP is actuated. For this purpose, the magnet valve 12 is moved from the venting position, shown in FIG. 1, to the aerating position, not shown in FIG. 1, so that the pilot control pressure pSV is actuated. The holding valve 14 is in the open switched position. The holding valve 14 has a first holding valve connection 14.1 and a second holding valve connection 14.2, wherein the first holding valve connection 14.1 is connected to the magnet valve 12, more specifically to the second magnet valve connection 12.2, and receives the pilot control pressure pSV. The second holding valve connection 14.2 is connected to the main valve unit 10, more specifically to the relay valve control connection 20.4. The holding valve 14 is electromagnetic and configured to be monostable and by providing a second switch signal S2 can be moved from the stable switched position, shown in FIG. 1, which is an open position, to a second, closed switched position, which is not stable, by energizing an electromagnet in the holding valve 14. In this way, if the magnet valve 12 is first switched such that the pilot control pressure pSV is actuated and the holding valve 14 is open, the pilot control pressure pSV is transmitted onward and actuated at the relay valve control connection 20.4, the latter consequently amplifying this pressure in volume and actuating the parking brake pressure pBP at the spring-accumulator connection 21. The holding valve 14 can now be moved to the closed second switched position, such that the pilot control pressure pSV is trapped between the second holding valve connection 14.2 and the relay valve control connection 20.4. The magnet valve 12 can now be moved to the first venting position shown in FIG. 1 again. The spring-accumulator brake cylinders 208*a*, 208*b* nevertheless remain aerated, and thus released. Even though only a variant having pilot control unit 8 and main valve unit 10 is described here, it should be understood that the main valve unit 10 is not mandatory, and the pilot control pressure pSV could likewise be actuated directly as parking brake pressure pBP. In this case, the second holding valve connection 14.2 would be connected to the spring-accumulator connection 21, without the interposition of the main valve unit 10.

The bistable magnet valve 12 ensures that the parking brake 2, even in the event of a failure in a power supply, remains in the switched position prevailing at the point of time of the failure. The holding valve 14 is monostable and automatically switches to the open position shown in FIG. 1 when the electromagnet is not energized. In contrast, the magnet valve 12 is held in the aerating position by the first permanent magnet 13.1, or held in the venting position by the second permanent magnet 13.2.

A further control mechanism of the electropneumatic valve unit 1 is made possible by the safety valve 50. As explained at the outset, the magnet valve 12 of the pilot control unit 8 is supplied with reservoir pressure pV only when the safety valve 50 is in the supply position 52. Consequently, the pilot control pressure pSV can be provided by the pilot control unit 8 at the relay valve control connection 20.4 also only when the safety valve 50 is in the supply position 52. In contrast, the pilot control unit 8 and at least also a first control line 58, which connects the pilot control unit 8 to the main valve unit 10, is inevitably vented independently of the switched position of the magnet valve 12, when the safety valve 50 is in the venting position 54.

The safety valve 50 has a safety valve control connection 50.4 and a safety valve holding connection 50.5. The safety valve holding connection 50.5 is provided to hold the safety valve 50 in the supply position 52, not shown in FIG. 1. The safety valve holding connection 50.5 is connected to the supply line 56 by a return line 60. The return line 60 forms a safety valve holding circuit 62 which returns a pressure pA, which is actuated by the safety valve 50 at the second safety valve connection 50.2, back to the safety valve 50, or to the safety valve holding connection 50.5, respectively. During regular operation, the actuated pressure pA corresponds to the reservoir pressure pV. The safety valve holding connection 50.5 is disposed in such a way that the actuated pressure pA acts on the safety valve 50 such that the latter is loaded toward the first switched position, not shown in FIG. 1, that is, the supply position 52.

The safety valve 50 has a preferred position; specifically, the safety valve 50 is preloaded to the venting position 54 shown in FIG. 1. Provided for this purpose is a spring 64 which preloads the safety valve 50 to the venting position 54 shown in FIG. 1. The actuated pressure pA which is applied to the safety valve holding connection 50.5 acts counter to this spring 64. When the safety valve 50 is in the supply position 52, the safety valve 50 is held in this supply position 52 by the actuated pressure pA provided at the safety valve holding connection 50.5, as long as the actuated pressure pA exceeds a first threshold value. However, if the actuated pressure pA sinks below the first threshold value, which can be for instance in a range from 150 kPa to 350 kPa, the force effected by the actuated pressure pA is lower than the spring force of the spring 64, such that the safety valve 50 drops back to the venting position 54 shown in FIG. 1.

No reservoir pressure pV is provided at the pilot control unit 8 in the venting position 54, and the pilot control unit 8 consequently also does not actuate any pilot control pressure pSV. If there is no other pressure provided at the relay valve control connection 20.4, the relay valve 20 vents the spring-accumulator connection 21, and parking brakes connected thereto clamp.

The switching of the safety valve 50 from the supply position 52 to the venting position 54 is performed automatically if the actuated pressure pA (in this embodiment the reservoir pressure pV) reaches or undershoots the first threshold value, such that the safety function is obtained. Should it arise in the event of a defect of the commercial vehicle 200 that the reservoir pressure pV drops because both the first and the second compressed-air reservoir 6, 7 are depleted, have a leak, or are actively pumped empty by the driver, the actuated pressure pA also drops when the safety valve 50 is in the supply position 52, not shown in FIG. 1. From a certain point, specifically preferably when undershooting the first threshold value, the spring 18 moves the safety valve 50 to the venting position 54 shown in FIG. 1, such that the relay valve control connection 20.4 is consequently vented, and a parking brake pressure pBP is no longer actuated. The spring-accumulator brake cylinders 208*a*, 208*b* are completely vented. The spring-accumulator brake cylinders 208*a*, 208*b* clamp and brake the commercial vehicle 200 even when service brake cylinders 209*a*, 209*b*, disposed on the rear axle, and service brake cylinders 210*a*, 210*b*, disposed on the front axle, cannot guarantee braking of the vehicle 200, or can guarantee only limited braking of the vehicle 200, owing to the reduced reservoir pressure pV.

In the venting position 54, the actuated pressure pA corresponds to an ambient pressure level, and the safety valve 50 remains in the venting position 54 independently of the pressure provided at the first safety valve connection 50.1. The parking brake remains engaged even when the reservoir pressure pV, having previously dropped below the first threshold value, subsequently exceeds the first threshold value again (unless a different pressure is provided at the relay valve control connection 20.4). If the first and/or the second compressed-air reservoir 6, 7 are/is replenished again in the venting position 54 of the safety valve 50, for example because the commercial vehicle 200 has regained power, or the first and the second compressed-air supplies 6, 7 have been replenished by a service technician, the safety valve 50 is nevertheless in the venting position 54 shown in FIG. 1, and the spring-accumulator connection 21 is not automatically and unintentionally aerated.

The safety valve control connection 50.4, at which a safety control pressure pSS can be provided, is provided for switching the safety valve 50 from the venting position 54 to the supply position 52. The safety valve 50 preferably switches to the supply position 52 when the safety control pressure pSS exceeds a second threshold value which can preferably be in the range from 150 kPa to 400 kPa. For providing the safety control pressure pSS, the safety valve control connection 50.4 is connected to a first safety control line 66.

In the first embodiment according to FIG. 1, the safety control pressure pSS is able to be provided in two ways. For this purpose, the safety control line 66 is connected to a third safety two-way valve connection 68.3 of a safety two-way valve 68, which furthermore has a first safety two-way valve connection 68.1 and a second safety two-way valve connection 68.2. Pressures can be provided at the first safety two-way valve connection 68.1 and at the second safety two-way valve connection 68.2, and the safety two-way valve 68 actuates the higher of these pressures at the third safety two-way valve connection 68.3. In this variant, the safety two-way valve 68 is an external valve which is disposed outside a housing 70 of the electropneumatic valve assembly 1.

The first safety two-way valve connection 68.1, by way of a second safety control line 72, is connected to a service brake connection 74, at which a service brake pressure pBB can be provided. The safety valve control connection 50.4 is connected to the service brake connection 74 indirectly by way of the first safety control line 66, the safety two-way valve 68 and the second safety control line 72, such that the service brake pressure pBB is able to be provided as safety control pressure pSS at the safety valve control connection 50.4. As soon as a service brake pressure pBB can be provided after a fault has been rectified, with it thus being possible again to carry out a service brake action by means of the service brake cylinders 210*a*, 210*b* of the front axle and/or the service brake cylinders 209*a*, 209*b* of the rear axle, it is also possible to release the parking brake again by aerating the spring accumulator connection 21. For this purpose, the service brake pressure pBB is provided as safety control pressure pSS at the safety valve control connection 50.4, for example by activating a brake pedal, whereupon the safety control valve 50 switches to the supply position 52. The pilot control unit 8 is thereupon supplied with reservoir pressure pV and provides the pilot control pressure pSV at the relay valve 20, which in turn actuates the parking brake pressure pBP and provides the latter at the spring accumulator connection 21. Parking brakes which are connected to the spring accumulator connection 21 are released and the vehicle is ready to be driven again.

Alternatively, the safety control pressure pSS in this embodiment can also be provided by way of a safety switch unit 78 which is connected to the second safety two-way valve connection 68.2 by way of a third safety control line 80. The safety switch unit 78 here has an electrically switchable safety switch valve 79 which is configured as a 3/2-way valve and has a first safety switch connection 79.1, a second safety switch connection 79.2, and a third safety switch connection 79.3. For providing a safety pilot control pressure pSSV, the second safety switch connection 79.2 is connected to the safety two-way valve 68. The safety switch valve 79 is a monostable valve and is preloaded to the venting position shown in FIG. 1, in which the second safety switch connection 79.2 and the third safety switch connection 79.3 are connected such that the third safety control line 80 is connected to the vent 3 by way of the safety switch valve 79. The vent 3 can be a second vent, or be connected to that vent 3 to which the relay valve venting connection 20.3 is also connected, for example.

In the switched position of the safety switch valve 79 shown in FIG. 1, the safety two-way valve 68 actuates the service brake pressure pBB. The first safety switch connection 79.1 is connected to the second compressed-air supply 7 such that reservoir pressure pV is applied to the first safety switch connection 79.1. When the ECU provides a third switch signal S3, which is also referred to as safety switch signal SSS, the safety switch valve 79 switches from the venting position, shown in FIG. 1, to an aerating position in which the first safety switch connection 79.1 is fluidically connected to the second safety switch connection 79.2. The safety pilot control pressure pSSV, which is actuated at the second safety switch connection 79.2 is then the reservoir pressure pV which, by way of the third safety control line 80, is also applied to the second safety two-way valve connection 68.2 of the safety two-way valve 68. If the safety pilot control pressure pSSV is higher than the service brake pressure pBB potentially provided at the first safety two-way valve connection 68.1, the safety two-way valve 68 then actuates the safety pilot control pressure pSSV (here the reservoir pressure pV) at the third safety two-way valve connection 68.3. This safety pilot control pressure pSSV is then, by way of the first safety control line 66, applied as safety control pressure pSS at the safety valve control connection 50.4. In this variant, the safety control pressure pSS is thus also actuatable as a function of the signal S3 provided by the ECU.

The parking brake module 2 in the embodiment shown here (FIG. 1) furthermore has a first pressure sensor 26 and a second pressure sensor 28. The first pressure sensor 26 is connected to the reservoir connection 4 by way of a first pressure measurement line 27 and thus measures the reservoir pressure pV and provides a corresponding first pressure signal SD1 at the electronic control unit ECU. The second pressure sensor 28 is connected to the spring-accumulator connection 21 by way of a second pressure measurement line 29 and thus detects the parking brake pressure pBP and provides a corresponding second pressure signal SD2 at the electronic control unit ECU. The actuation of the pressures, and the switched position of the individual valves, can be verified and tested for plausibility by way of the first and second pressure signals SD1, SD2.

In the first embodiment illustrated in FIG. 1, the service brake connection 74 is a release control connection 76, and so the service brake pressure pBB is a release control pressure pL. Such a release control connection 76 is also referred to as anti-compound connection by way of which the release control pressure pL can be introduced. The release control connection 76 is connected to a release control path 32. The release control pressure pL which is introduced by way of the release control connection 76 causes the parking brake pressure pBP to be actuated at the at least one spring-accumulator connection 21. The release control path 32 includes a release line 33 which extends from the release control connection 76. The service brake pressure pBB of a further axle, for example of the front and/or rear axle, is used as release control pressure pL. Should the spring-accumulator brake cylinders 208*a*, 208*b*, which are connected to the spring-accumulator connection 21, also be used for additional braking or emergency braking, an excessive activation of the spring-accumulator brake cylinders 208*a*, 208*b*, which could lead to blocking of the vehicle 200, is to be prevented in this way. When service brakes on the rear axle are activated, the spring-accumulator brake cylinders 208*a*, 208*b* should therefore ideally not be simultaneously engaged, such that it is expedient to provide the service brake pressure of the rear axle as release control pressure pL to the release control connection 76, so as to release the spring-accumulator brake cylinders 208*a*, 208*b*, reciprocating the engagement of the service brakes.

The release line 33 is connected to a main control two-way valve 34. The release control pressure pL can be supplied to the relay valve control connection 20.4 by way of the release control path 32. The main control two-way valve 34 has a first main control two-way valve connection 34.1, a second main control two-way valve connection 34.2, and a third main control two-way valve connection 34.3. The main control two-way valve 34 is configured in such a way that it transmits onward to the third main control two-way valve connection 34.3 the higher of the pressures applied to the first and the second main control two-way valve connection 34.1, 34.2. The first main control two-way valve connection 34.1 here is connected to the second main control two-way valve connection 34.2 by way of a second control line 36, but may also be connected directly to the second holding valve connection 14.2 or else to the magnet valve 12. In any case, the first main control two-way valve connection 34.1 is connected to the pilot control unit 8 and receives the pilot control pressure pSV. The second main control two-way valve connection 34.2 is connected to the release control connection 76 and receives the release control pressure pL. The third main control two-way valve connection 34.3 is connected to the relay valve control connection 20.4 such that the respective higher one of the pilot control pressure pSV and the release control pressure pL is actuated to the relay valve control connection 20.4, so as to effect the actuation of the parking brake pressure pBP.

The release control connection 76 in this embodiment (FIG. 1) fulfils a particularly advantageous dual function. On the one hand, the anti-compound function is fulfilled, that is, the prevention of excessive activation of the brakes and, on the other hand, the release control pressure pL can be utilized as safety control pressure pSS for switching the safety valve 50 to the supply position 52. As a result, the necessary complexity for a fluidic connection between the components can be reduced, and an additional connection can be saved.

The further embodiments shown in FIG. 2 to FIG. 6 are based fundamentally on the first embodiment (FIG. 1). and so identical and equivalent elements are provided with the same reference signs. In this respect, reference is made in full to the above description pertaining to the first embodiment (FIG. 1). The differences with respect to the first embodiment are highlighted in particular below.

The substantial difference in the second embodiment (FIG. 2) lies in that the safety two-way valve 68 is not configured as an external valve but is disposed within the housing 70. The service brake connection 74, which here too forms the release control connection 76, is disposed directly on the housing 70. Furthermore, besides being connected to the second compressed-air reservoir 7, the safety switch unit in the second embodiment is also connected to the first compressed-air reservoir 6.

In the third embodiment (FIG. 3), the electropneumatic valve assembly 1 is configured as a highly integrated valve assembly. Both the safety two-way valve 68 and the safety switch unit 78 are integrated in the housing 70. The functionality is substantially unchanged in comparison to the first two embodiments. As is indicated by a dashed line 82 in FIG. 3, the reservoir two-way valve 5 can be disposed both within the housing 70 and also outside it. Should the reservoir two-way valve 5 be disposed within the housing (the dashed line 82), the electropneumatic valve assembly 1 has two reservoir connections 4.

Figure 4:
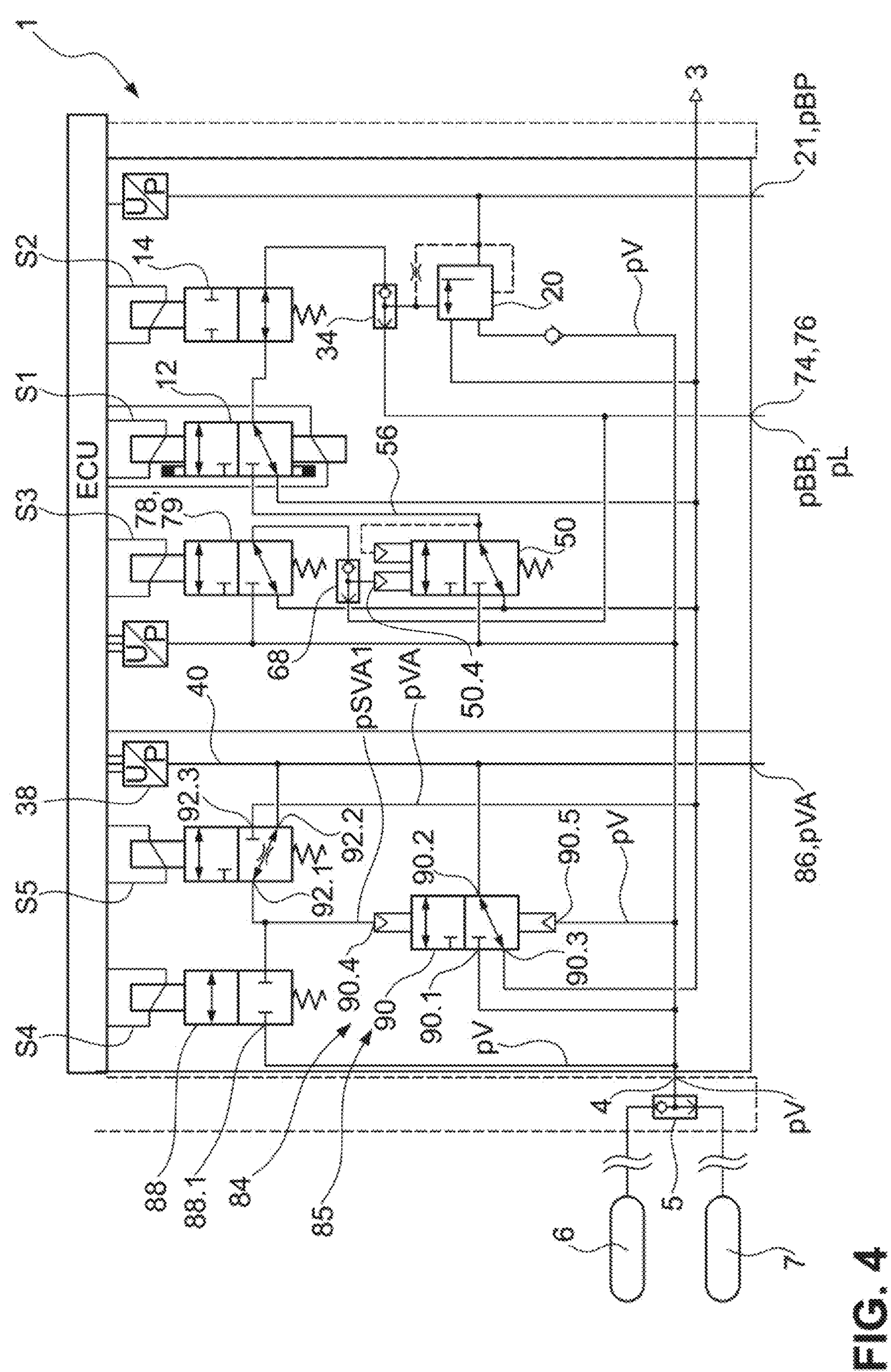
FIG. 4 shows a fourth embodiment of an electropneumatic valve assembly.

In the fourth embodiment according to FIG. 4, the electropneumatic valve assembly 1 is configured in a substantially analogous manner to the third embodiment (FIG. 3), but additionally has a trailer unit 84. Trailer reservoir pressure pVA can be provided at a trailer reservoir connection 86 by way of a trailer supply unit 85 of the trailer unit 84, so as to supply service brake cylinders of a trailer (not illustrated) connected to the commercial vehicle 200. For this purpose, the trailer supply unit 85 in this embodiment has a trailer supply switch valve 88, a trailer supply protection valve 90, and a trailer supply holding valve 92. The trailer supply switch valve 88 has a first trailer switch connection 88.1 and a second trailer switch connection 88.2. The trailer supply protection valve 90 has a first trailer protection connection 90.1, a second trailer protection connection 90.2, and a third trailer protection connection 90.3. The trailer supply holding valve 92 has a first trailer holding connection 92.1, a second trailer holding connection 92.2, and a third trailer holding connection 92.3. The trailer supply switch valve 88 is configured as an electrically switchable monostable 2/2-way valve. When the ECU provides a fourth switch signal S4, the trailer supply switch valve 88 switches from a closure position shown in FIG. 4, in which the first trailer switch connection 88.1 and the second trailer switch connection 88.2 are separated, to an aerating position in which the first trailer switch connection 88.1 and the second trailer switch connection 88.2 are connected. The first trailer switch connection 88.1 is connected to the reservoir connection 4 and receives reservoir pressure pV. In the aerating position, the trailer supply switch valve 88 transmits the reservoir pressure pV onward and provides it at a first trailer protection valve control connection 90.4.

The trailer supply protection valve 90 is a bistable 3/2-way valve which, by providing the reservoir pressure pV at the first trailer protection valve control connection 90.4, is switchable from a venting position, shown in FIG. 4, to an aerating position. In the aerating position, the first trailer protection connection 90.1 and the second trailer protection connection 90.2 are fluidically connected, such that reservoir pressure pV is directed from the reservoir connection 4 by way of the first trailer protection connection 90.1 to the second trailer protection connection 90.2, and to the trailer reservoir connection 86 which is connected to the second trailer protection connection 90.2. The trailer reservoir pressure pVA then corresponds to the reservoir pressure pV. In contrast, in the venting position, the trailer supply protection valve 90 connects the trailer reservoir connection 86 to the vent 3.

During this initial switching, the reservoir pressure pV, which is provided by the trailer supply switch valve 88 at the first trailer protection valve control connection 90.4, forms a first trailer pilot control pressure pSVA1. The trailer supply holding valve 92 is provided in order not to have to permanently provide this reservoir pressure pV, or to avoid having to permanently provide the fourth switch signal, respectively. The second trailer holding connection 92.2 is connected directly to the trailer reservoir connection 86. Should reservoir pressure pV be actuated at the second trailer protection connection 90.2, the reservoir pressure pV is supplied both to the trailer reservoir connection 86 and to the second trailer holding connection 92.2. The trailer supply holding valve 92 is configured as a monostable 3/2-way valve which has a holding position, shown in FIG. 4, as preferred position. In this holding position, the second trailer holding connection 92.2 is fluidically connected to the first trailer holding connection 92.1, such that the trailer reservoir pressure pVA is provided as first trailer pilot control pressure pSVA1 at the first trailer protection valve control connection 90.4. After the initial switching of the trailer supply protection valve 90, the trailer supply switch valve 88 can return to the closed position shown in FIG. 4, and the switched position of the trailer supply protection valve 90 is held by returning the trailer reservoir pressure pVA by way of the trailer supply holding valve 92. The trailer supply holding valve 92 can preferably be, as is illustrated in FIG. 4, configured as a throttle valve, which equalizes small pressure fluctuations of the trailer reservoir pressure pVA.

In contrast however, if the ECU provides a fifth switch signal S5, the trailer supply holding valve 92 switches to a venting position and connects the first trailer protection valve control connection 90.4 to the vent 3 by way of the first trailer holding connection 92.1 and the third trailer holding connection 92.3. A second trailer protection valve control connection 90.5 is connected directly to the reservoir connection 4, so that the reservoir pressure pV is applied to the latter. If the first trailer protection valve control connection 90.4 is now vented, the pressure applied to the second trailer protection valve connection 90.5 is greater than the pressure applied to the first trailer protection valve control connection 90.4, and the trailer supply protection valve 90 switches to the venting position shown in FIG. 4. In this venting position, the second trailer protection connection 90.2, and thus also the trailer reservoir connection 86, is connected to the vent 3.

However, the switching of the trailer supply protection valve 90 from the aerating position to the venting position shown in FIG. 4 can also take place as a protection function when the trailer supply holding valve 92 is in the switched position shown in FIG. 4. For example, if a pneumatic connection to the trailer is ripped off, the trailer protection connection 86 is abruptly vented. Consequently, the first trailer protection valve control connection 90.4 is also vented since it is fluidically connected to the trailer reservoir connection 86 by way of the first trailer holding connection 92.1 and the second trailer holding connection 92.2. The reservoir pressure pV continues to be applied to the second trailer protection valve control connection 90.5, such that the trailer supply protection valve automatically switches to the venting position shown in FIG. 4, thus interrupting a fluidic connection between the compressed-air reservoirs 6, 7 and the trailer reservoir connection. A depletion of the compressed-air reservoirs 6, 7 in the event of an unanticipated venting of the trailer reservoir connection 86 is prevented.

The parking brake module 2 in the embodiment shown here (FIG. 4) furthermore has a third pressure sensor 38 which is connected to the trailer reservoir connection 86 by way of a third pressure measurement line 40. The third pressure sensor 38 measures the trailer reservoir pressure pVA and provides a corresponding third pressure signal SD3 at the electronic control unit ECU. The actuation of the trailer reservoir pressure pVA, and the switched position of the individual valves of the trailer supply unit 85, can be verified and tested for plausibility by way of the third pressure signal SD3.

Figure 5:
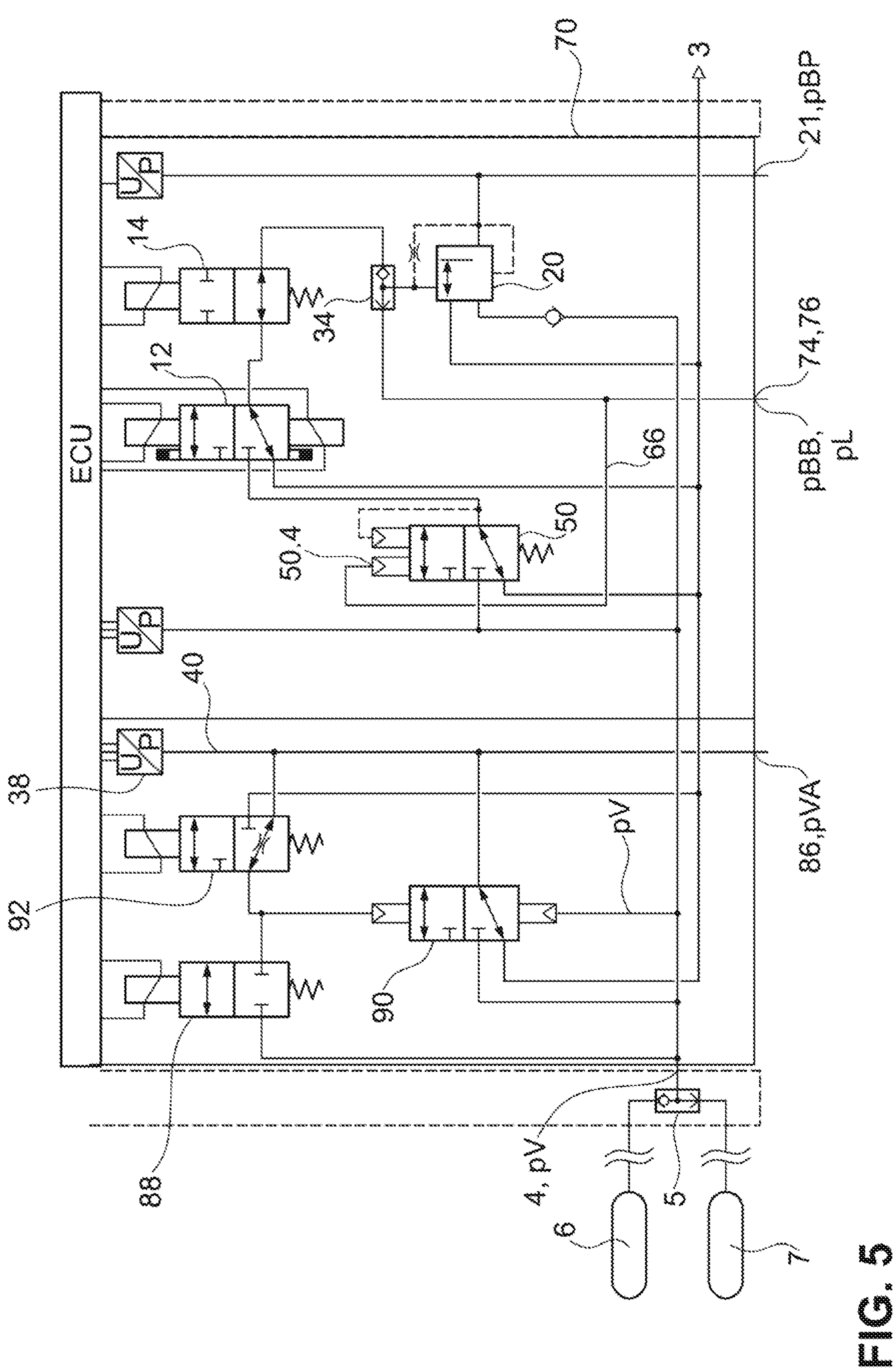
FIG. 5 shows a fifth embodiment of an electropneumatic valve assembly.

The fifth embodiment shown in FIG. 5 is based fundamentally on the fourth embodiment (FIG. 4). The substantial difference in the fifth embodiment lies in that no safety switch unit 78 is provided. The safety valve control connection 50.4, or the first safety control line 66, respectively, are connected directly to the service brake connection 74, which is the release control connection 76 also in the fifth embodiment, so as to receive the service brake pressure pBB, or the release control pressure pL, respectively.

The sixth embodiment (FIG. 6) is likewise based fundamentally on the fourth embodiment (FIG. 4), but differs therefrom on account of an additional trailer control unit 94 of the trailer unit 84 and on account of the safety control pressure pSS being provided in an alternative way. The trailer control unit 94 is provided to actuate a trailer brake pressure pBA at a trailer control connection 96, which is provided for activating service brakes of the trailer. For this purpose, the trailer control unit 94 has a trailer pilot control unit 98 and a trailer main valve unit 100. In this embodiment, the trailer pilot control unit 98 includes a first electrically controllable trailer pilot control valve 102 having a first trailer pilot control valve connection 102.1 and a second trailer pilot control valve connection 102.2, and a trailer venting valve 104 having a first trailer venting valve connection 104.1 and a second trailer venting valve connection 104.2. The trailer pilot control valve here is a monostable 2/2-way valve having a venting position and a closed position. In the closed position shown in FIG. 6, to which the trailer pilot control valve 102 is preloaded in the non-energized state, the two trailer pilot control valve connections 102.1, 102.2 are not connected to one another. By providing a sixth switch signal S6, the trailer pilot control valve 102 can be gradually switched to the venting position by the ECU. The first trailer pilot control valve connection 102.1 is connected directly to the reservoir connection 4, so that reservoir pressure pV is applied to it. The trailer pilot control valve 102 then actuates a second trailer pilot control pressure pSVA2 as a function of the sixth switch signal S6, which is consequently provided at the trailer main valve unit 100 by way of a trailer pilot control line 106.

The trailer venting valve 104 is provided to vent the trailer pilot control line 106. In the sixth embodiment (FIG. 6), the trailer venting valve 104 is configured as an electrically switchable monostable 2/2-way valve which is preloaded to an open position in which the two trailer venting valve connections 104.1, 104.2 are not connected to one another. When the ECU provides a seventh switch signal S7 at the trailer venting valve 104, the latter switches to a venting position and connects the trailer pilot control line 106 to the vent 3 by way of the first trailer venting valve connection 104.1 and the second trailer venting valve connection 104.2.

The trailer main valve unit 100 here has only one trailer relay valve 108 which acts in a manner substantially analogous to the relay valve 20 and has a trailer relay valve reservoir connection 108.1, a trailer relay valve working connection 108.2, a trailer relay valve venting connection 108.3, and a trailer relay valve control connection 108.4. The trailer relay valve reservoir connection 108.1 is connected to the reservoir connection 4 and receives reservoir pressure pV. The trailer relay valve venting connection 108.3 is connected to the vent 3. The trailer relay valve receives, at the trailer relay valve control connection 108.4, the trailer pilot control pressure pSVA2, which is provided at the trailer pilot control line 106, and actuates the corresponding trailer brake pressure pBA in a manner amplified in volume at the trailer relay valve working connection 108.2. This pressure pBA is measured by a fourth pressure sensor 109 which is configured in a manner substantially analogous to the other pressure sensors 26, 28, 38 and provides a fourth pressure signal SD4 at the ECU.

In this embodiment, a trailer control protection valve 110 is disposed between the trailer relay valve working connection 108.2 and the trailer control connection 96 such that the trailer brake pressure pBA is not actuated directly by a trailer relay valve working connection 108.2 at the trailer control connection 96. Rather, the trailer brake pressure pBA is provided at the trailer control connection 96 only if the trailer control protection valve 110 is in a supply position (not shown in FIG. 6). In the supply position, a first trailer control protection valve connection 110.1 and a second trailer control protection valve connection 110.2 are fluidically connected such that the trailer brake pressure pBA is actuated onward. However, if the trailer control protection valve 110 is in the protection position shown in FIG. 6, the trailer control connection 96 and the trailer relay valve working connection 108.2 are separated by the trailer control protection valve 110. An uncontrolled collapse of the trailer brake pressure pBA, for example if a pneumatic trailer control line to the trailer is ripped off, is prevented.

Figure 6:
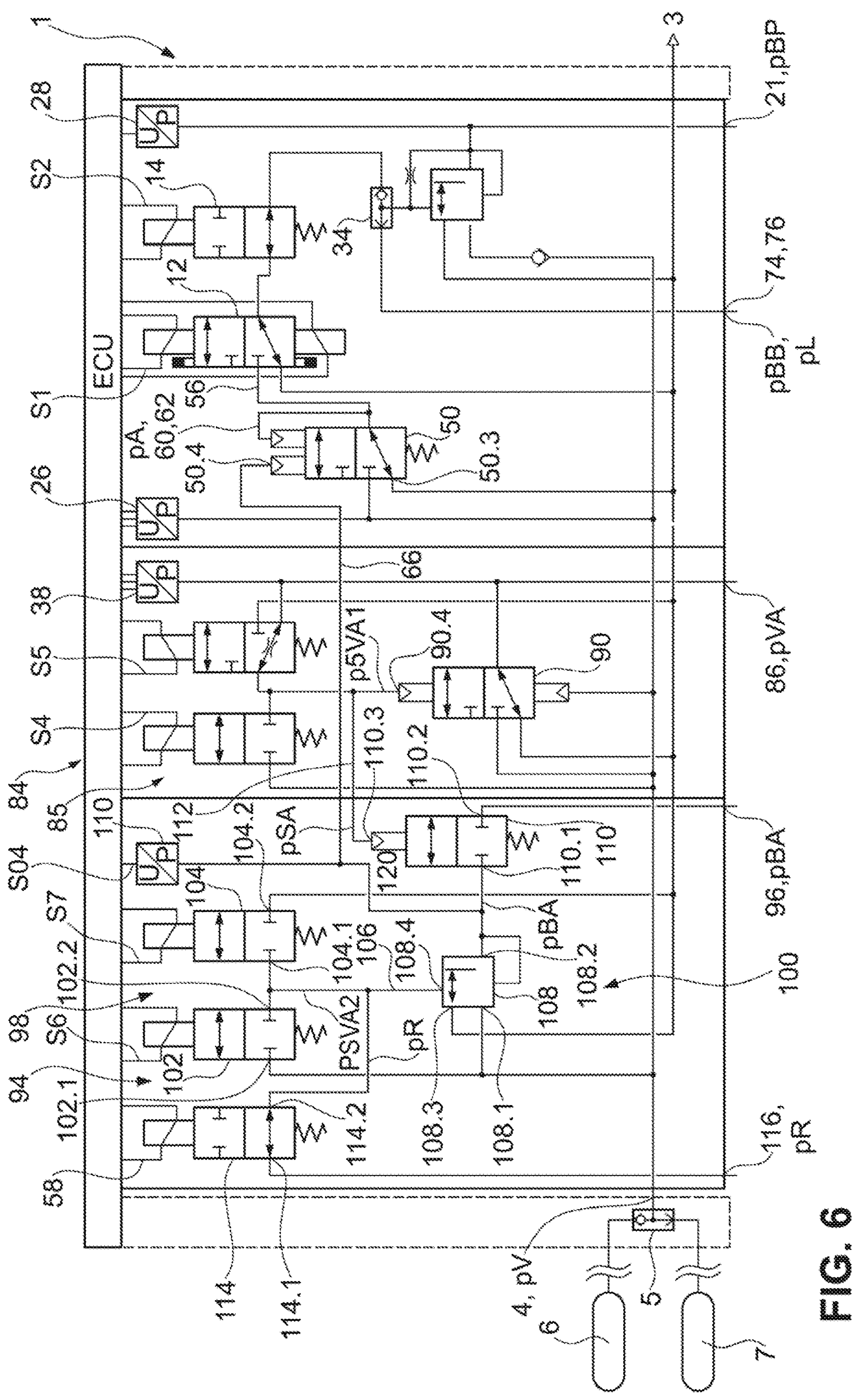
FIG. 6 shows a sixth embodiment of an electropneumatic valve assembly.

In order for the trailer control protection valve 110 to be moved to the supply position, not shown in FIG. 6, a trailer protection pressure pSA has to be provided at a trailer control protection valve control connection 110.3. As soon as this trailer protection pressure pSA exceeds a predefined threshold value, the trailer control protection valve 110 is switched and connects the trailer control connection 96 and the trailer relay valve working connection 108.2, so that the trailer brake pressure pBA can be actuated.

In this variant of the electropneumatic valve assembly 1, the trailer control protection valve control connection 110.3 is connected to the first trailer protection valve control connection 90.4 by way of a trailer control line 112, such that the first trailer pilot control pressure pSVA1 is the trailer protection pressure pSA. When a pressure drop occurs at the trailer reservoir connection 86, it is achieved as a result that both the supply of trailer reservoir pressure pVA to the trailer at the trailer reservoir connection 86 and the supply of trailer brake pressure pBA to the trailer by way of the trailer control connection 96 are interrupted. The brake system 202 is thus protected in a simple way.

In order to nevertheless be able to emit a trailer brake pressure pBA in the event of an electrical fault in the ECU, the trailer control unit 94 furthermore has a redundancy valve 114 which has a first redundancy valve connection 114.1 and a second redundancy valve connection 114.2. The first redundancy valve connection 114.1 is connected to a redundancy connection 116 by way of which a redundancy pressure pR can be provided at the first redundancy valve connection 114.1. The redundancy pressure pR in a brake system 202 (FIG. 7) can preferably be provided by a brake value encoder such as, for example, an electronic footbrake module 220 (FIG. 7).

In normal operation, the redundancy valve 114 is in the operating position, not shown in FIG. 6, in which the first redundancy valve connection 114.1 and the second redundancy valve connection 114.2 are not connected. The redundancy valve 114 is held in this operating position when the ECU provides an eighth switch signal S8 at the redundancy valve 114. If the eighth switch signal S8 is not provided, for example if the redundancy valve 114 is not energized owing to an electrical fault in the ECU, the redundancy valve 114 then automatically switches to the redundancy position shown in FIG. 6. In this case, the trailer pilot control valve 102 and the trailer venting valve 104 are typically open (in the switch positions shown in FIG. 6), such that the redundancy pressure pR is provided at the trailer relay valve control connection 108.4 by way of a redundancy line 118. The trailer relay valve 108 then actuates a trailer brake pressure pBA which corresponds to the redundancy pressure pR.

In this embodiment, the first safety control line 66, which leads to the safety valve control connection 50.4 of the safety valve, is not connected to the release control connection 76 as in the preceding embodiments, but to a trailer service brake connection 120. The trailer brake pressure pBA is actuated at the trailer service brake connection 120, the trailer brake pressure pBA in this embodiment being a pressure derived from the redundancy pressure pR provided at the redundancy connection 116 if the trailer control unit 94 is not energized. However, it can also be preferably provided that the redundancy pressure pR is provided directly as service brake pressure pBB at the safety valve control connection 50.4. The trailer service brake connection 120 here is an internal connection which is connected to the trailer relay valve working connection 108.2. However, it can also be provided that the trailer service brake connection 120 is an external connection at which the trailer brake pressure pBA is provided. Furthermore, it can also be provided that the safety valve control connection 50.4 is connected to the redundancy connection 116, which can be a service brake connection 74.

If the safety valve 50 is to be moved to the supply position 52, not shown in FIG. 6, a trailer brake pressure pBA must be provided at the trailer service brake connection 120 by way of the trailer control unit 94. In this embodiment, the trailer pilot control unit 98 also forms the safety switch unit 78, wherein the second trailer pilot control pressure pSVA2 is the safety pilot control pressure pSSV. In response to this safety pilot control pressure pSSV (the second trailer pilot control pressure pSVA2), the trailer relay valve 108 actuates the trailer brake pressure pBA, which simultaneously forms the safety control pressure pSS. A dual utilization of an available pressure (the trailer brake pressure) as safety control pressure pSS also takes place in this embodiment, as a result of which a simple, compact and cost-effective construction mode is achieved.

Figure 7:
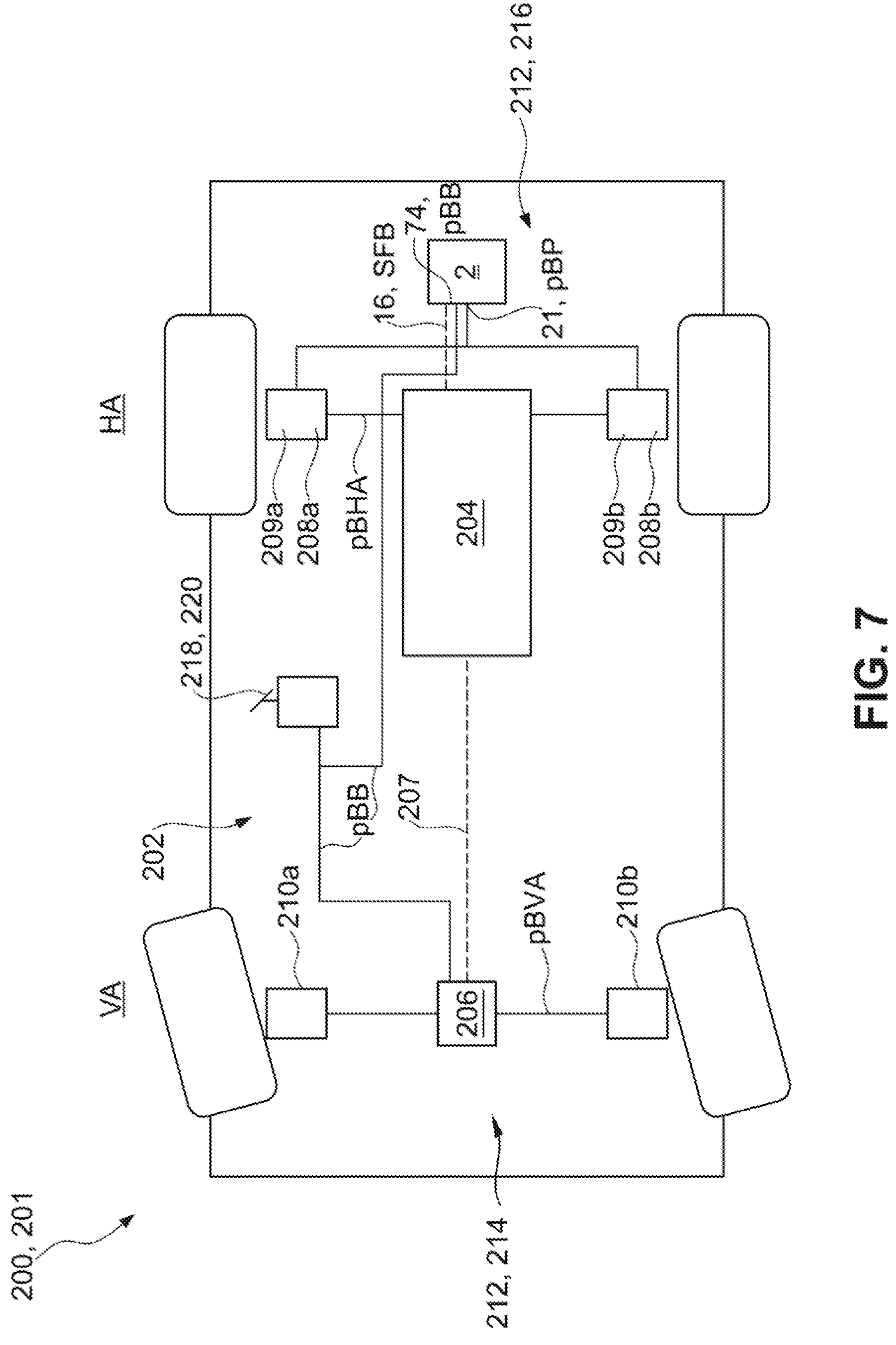
FIG. 7 shows a commercial vehicle.

Finally, FIG. 7 illustrates the vehicle 200, that is, the commercial vehicle, having the brake system 202, which is configured here as an electronically controllable pneumatic brake system. The vehicle 200 has a front axle VA and a rear axle HA. A central module 204, which is also configured as a rear axle modulator, brakes the rear axle HA, and a front axle modulator 206 is assigned to the front axle VA. The central module 204 and the front axle modulator 206 are connected to one another by way of an electronic line 207 and in this way exchange signals, such as in particular brake signals. Besides first and second spring-accumulator brake cylinders 208*a*, 208*b*, first and second service brake cylinders 209*a*, 209*b* are also provided on the rear axle HA, the service brake cylinders 209*a*, 209*b*, together with the spring-accumulator brake cylinders 208*a*, 208*b*, being able to be accommodated in so-called Tristop cylinders. The front axle modulator 206 on the front axle VA actuates corresponding brake pressures at front axle service brake cylinders 210*a*, 210*b*. The vehicle thus has two service brake circuits 212: a front axle brake circuit 214 and a rear axle brake circuit 216. A front axle brake pressure pBVA is provided at the front axle brake circuit 214, and a rear axle brake pressure pBHA is provided at the rear axle brake circuit. A brake module 218, which in this embodiment is an electropneumatic footbrake module 220, is provided for providing the front axle brake pressure pBVA, which here simultaneously forms the service brake pressure pBB. The spring-accumulator brake cylinders 208*a*, 208*b* are controlled by way of a parking brake module 2 in which the electropneumatic valve assembly 1 according to the disclosure is implemented. The parking brake module 2 has the spring-accumulator connection 21 which is connected to the spring-accumulator brake cylinders 208*a*, 208*b*, as shown in FIG. 7. The vehicle BUS 16 connects the parking brake module 2 to the central module 204.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Electropneumatic valve assembly
2 Parking brake module
3 Vent
4 Reservoir connection
5 Reservoir two-way valve
6 First compressed-air reservoir
7 Second compressed-air reservoir
8 Pilot control unit
10 Main valve unit
12 Electromagnetic magnet valve
12.1 First magnet valve connection
12.2 Second magnet valve connection
12.3 Third magnet valve connection
12.4 Safety control connection
13.1 First permanent magnet
13.2 Second permanent magnet
13.3 First coil
13.4 Second coil
14 Holding valve
14.1 First holding valve connection
14.2 Second holding valve connection
16 Vehicle BUS
18 Spring
20 Relay valve
20.1 Relay valve reservoir connection
20.2 Relay valve operating connection
20.3 Relay valve venting connection
20.4 Relay valve control connection

21 Spring-accumulator connection
26 First pressure sensor
27 First pressure measurement line
28 Second pressure sensor
29 Second pressure measurement line
32 Release control path
33 Release line
34 Main control two-way valve
34.1 First main control two-way valve connection
34.2 Second main control two-way valve connection
34.3 Third main control two-way valve connection
36 Second control line
38 Third pressure sensor
40 Third pressure measurement line
50 Safety valve
50.1 First safety valve connection
50.2 Second safety valve connection
50.3 Third safety valve connection
50.4 Safety valve control connection
50.5 Safety valve holding connection
51 Tension spring
52 Supply position
54 Venting position
56 Supply line
58 First control line
60 Return line
62 Safety valve holding circuit
64 Spring
66 First safety control line
68 Safety two-way valve
68.1 First safety two-way valve connection
68.2 Second safety two-way valve connection
68.3 Third safety two-way valve connection
70 Housing
72 Second safety control line
74 Service brake connection
76 Release control connection
78 Safety switch unit
79 Safety switch valve
79.1 First safety switch connection
79.2 Second safety switch connection
79.3 Third safety switch connection
80 Third safety control line
82 Dashed line
84 Trailer unit
85 Trailer supply unit
86 Trailer reservoir connection
88 Trailer supply switch valve
88.1 First trailer switch connection
88.2 Second trailer switch connection
88.3 Third trailer switch connection
90 Trailer supply protection valve
90.1 First trailer protection connection
90.2 Second trailer protection connection
90.3 Third trailer protection connection
90.4 First trailer protection valve control connection
90.5 Second trailer protection valve control connection
92 Trailer supply holding valve
92.1 First trailer holding connection
92.2 Second trailer holding connection
92.3 Third trailer holding connection
94 Trailer control unit
96 Trailer control connection
98 Trailer pilot control unit
100 Trailer main valve unit
102 Trailer pilot control valve
102.1 First trailer pilot control valve connection

102.2 Second trailer pilot control valve connection
104 Trailer venting valve
104.1 First trailer venting valve connection
104.2 Second trailer venting valve connection
106 Trailer pilot control line
108 Trailer relay valve
108.1 Trailer relay valve reservoir connection
108.2 Trailer relay valve working connection
108.3 Trailer relay valve venting connection
108.4 Trailer relay valve control connection
109 Fourth pressure sensor
110 Trailer control protection valve
110.1 First trailer control protection valve connection
110.2 Second trailer control protection valve connection
110.3 Trailer control protection valve control connection
112 Trailer control line
114 Redundancy valve
114.1 First redundancy valve connection
114.2 Second redundancy valve connection
116 Redundancy connection
118 Redundancy line
120 Trailer service brake connection
200 Vehicle
201 Commercial vehicle
202 Brake system
204 Central module
206 Front axle modulator
208*a*, 208*b* Spring-accumulator brake cylinders
209*a*, 209*b* Service brake cylinders on the rear axle
210*a*, 210*b* Service brake cylinders on the front axle
212 Service brake circuit
214 Front axle brake circuit
216 Rear axle brake circuit
218 Brake module
220 Electropneumatic footbrake module
ECU Electronic control unit
pA Actuated pressure
pBA Trailer brake pressure
pBB Service brake pressure
pBP Parking brake pressure
pBHA Rear axle brake pressure
pBVA Front axle brake pressure
pL Release control pressure
pR Redundancy pressure
pSA Trailer protection pressure
pSS Safety control pressure
pSSV Safety pilot control pressure
pSV Pilot control pressure
pSVA1 First trailer pilot control pressure
pSVA2 Second trailer pilot control pressure
pV Reservoir pressure
pVA Trailer reservoir pressure
SD1 First pressure signal
SD2 Second pressure signal
SD3 Third pressure signal
SFB Parking brake signal
SSS Safety switch signal
S1 First switch signal
S2 Second switch signal
S3 Third switch signal
S4 Fourth switch signal
S5 Fifth switch signal
S6 Sixth switch signal
S7 Seventh switch signal
S8 Eighth switch signal

The invention claimed is:

1. An electropneumatic valve assembly for activating a parking brake function of an electropneumatic brake system of a commercial vehicle, the electropneumatic valve assembly comprising:

- a pilot control unit configured to actuate a pilot control pressure as a function of an electronic parking brake signal;
- a main valve unit configured to receive the pilot control pressure and to actuate a parking brake pressure at least at one spring-accumulator connection;
- a service brake connection for receiving a service brake pressure;
- a pneumatically switchable self-holding safety valve disposed upstream of said pilot control unit and having a safety valve control connection for receiving a safety control pressure and a safety valve holding circuit for receiving a pressure actuated by said pneumatically switchable self-holding safety valve or a pressure derived therefrom;
- said pneumatically switchable self-holding safety valve, by receiving said safety control pressure, is switchable from a venting position, in which said pneumatically switchable self-holding safety valve connects said pilot control unit to a vent, to a supply position, in which said pneumatically switchable self-holding safety valve supplies said pilot control unit with reservoir pressure;
- said pneumatically switchable self-holding safety valve being configured to remain in the supply position or switch to the venting position as a function of said actuated pressure received at said safety valve holding circuit; and,
- said service brake connection being fluidically connected directly or indirectly to said safety valve control connection.

2. The electropneumatic valve assembly of claim 1, wherein said service brake connection is connectable to at least one of a front axle brake circuit and a rear axle brake circuit; and, said service brake pressure is at least one of a front axle brake pressure and a rear axle brake pressure of the commercial vehicle.

3. The electropneumatic valve assembly of claim 2, wherein said service brake connection is a release control connection; and, said service brake pressure is a release control pressure.

4. The electropneumatic valve assembly of claim 3 further comprising a main control two-way valve configured to receive said pilot control pressure and said release control pressure and to provide a higher of said pilot control pressure and said release control pressure for said main valve unit; and, said main valve unit being configured to actuate said parking brake pressure as a function of said release control pressure or of said pilot control pressure.

5. The electropneumatic valve assembly of claim 1, wherein said service brake connection is a redundancy connection; and said service brake pressure is a redundancy brake pressure or a pressure derived from said redundancy brake pressure.

6. The electropneumatic valve assembly of claim 1, wherein said service brake connection is a trailer service brake connection; and, said service brake pressure is a trailer brake pressure.

7. The electropneumatic valve assembly of claim 1, further comprising an electropneumatic safety switch unit configured to actuate a safety pilot control pressure as a function of an electronic safety switch signal.

8. The electropneumatic valve assembly of claim 7 further comprising a safety two-way valve configured to receive said safety pilot control pressure and said service brake pressure and to actuate a higher of said safety pilot control pressure and said service brake pressure as a safety control pressure.

9. The electropneumatic valve assembly of claim 7, wherein said safety switch unit is configured to receive the reservoir pressure, and in a first switched position, is configured to actuate said reservoir pressure as said safety pilot control pressure.

10. The electropneumatic valve assembly of claim 8, wherein said safety switch unit in a second switched position connects the safety two-way valve to a vent.

11. The electropneumatic valve assembly of claim 9, wherein said safety switch unit in a second switched position connects the safety two-way valve to a vent.

12. The electropneumatic valve assembly of claim 1, wherein said pneumatically switchable self-holding safety valve is configured to remain in said supply position if the actuated pressure applied to said safety valve holding circuit exceeds a first threshold value; and, said pneumatically switchable self-holding safety valve is configured to switch to said venting position if said actuated pressure applied to said safety valve holding circuit reaches or undershoots said first threshold value.

13. The electropneumatic valve assembly of claim 12, wherein said first threshold value is in a range from 200 kPa to 350 kPa.

14. The electropneumatic valve assembly of claim 12, wherein said first threshold value is in a range from 250 kPa to 315 kPa.

15. The electropneumatic valve assembly of claim 1, wherein said pneumatically switchable self-holding safety valve has a tension spring which preloads said pneumatically switchable self-holding safety valve to said venting position.

16. The electropneumatic valve assembly of claim 1, wherein said pilot control unit is a bistable pilot control unit.

17. The electropneumatic valve assembly of claim 16, wherein said bistable pilot control unit has a bistable electromagnetic magnet valve having at least one first permanent magnet.

18. An electropneumatic brake system comprising:

- an electropneumatic valve assembly for activating a parking brake function of the electropneumatic brake system of a commercial vehicle;
- said electropneumatic valve assembly including a pilot control unit configured to actuate a pilot control pressure as a function of an electronic parking brake signal and a main valve unit configured to receive the pilot control pressure and to actuate a parking brake pressure at least at one spring-accumulator connection;
- said electropneumatic valve assembly further including a service brake connection for receiving a service brake pressure;
  - said electropneumatic valve assembly further including a pneumatically switchable self-holding safety valve disposed upstream of said pilot control unit;
  - said pneumatically switchable self-holding safety valve having a safety valve control connection for receiving a safety control pressure and a safety valve holding circuit for receiving a pressure actuated by said pneumatically switchable self-holding safety valve or a pressure derived therefrom;
- said pneumatically switchable self-holding safety valve, by receiving said safety control pressure, is switchable from a venting position, in which said pneumatically switchable self-holding safety valve connects said pilot control unit to a vent, to a supply position, in which said pneumatically switchable self-holding safety valve supplies said pilot control unit with reservoir pressure;

said pneumatically switchable self-holding safety valve being configured to remain in the supply position or switch to the venting position as a function of said actuated pressure received at said safety valve holding circuit;

said service brake connection being fluidically connected directly or indirectly to said safety valve control connection;

a service brake circuit having a brake module configured to provide said service brake pressure; and, said brake module being fluidically connected to said service brake connection of said electropneumatic valve assembly.

19. A vehicle, comprising the electropneumatic brake system of claim 18.

* * * * *